United States Patent [19]
Tanaka

[11] 3,754,460
[45] Aug. 28, 1973

[54] DEVICE FOR OPERATING FILM PRESSURE PLATE IN PHOTOGRAPHIC CAMERA

[75] Inventor: Harumi Tanaka, Kobe, Japan

[73] Assignee: Minolta Camera Kabushiki Kaisha, Osaka, Japan

[22] Filed: Feb. 10, 1972

[21] Appl. No.: 225,211

[52] U.S. Cl............... 95/31 R, 95/31 AC, 95/11 R, 352/225
[51] Int. Cl............................ G03b 1/48, G03b 1/66
[58] Field of Search..................... 95/31 AC, 31 FL, 95/31 FM, 31 R, 11 R; 352/225, 230

[56] References Cited
UNITED STATES PATENTS

| | | | |
|---|---|---|---|
| 2,040,018 | 5/1936 | Kilfitt............................... | 95/31 AC |
| 2,753,777 | 7/1956 | Faulhaber et al.................. | 95/31 R |
| 2,949,831 | 8/1960 | Bretthauer....................... | 95/31 AC |
| 3,110,237 | 11/1963 | Scholkemeier et al.......... | 352/225 X |

Primary Examiner—Robert P. Greiner
Attorney—Stanley Wolder

[57] ABSTRACT

A device includes winding means and counter driving means. The winding means has a drive cam rotatable in one direction in operative relation to a film winding operation and to be stopped after completing a definite angle of rotation when the film has been transported by one frame. Under the control of the winding means, the counter driving means is rapidly moved in a first direction upon initiation of the winding operation and returned in a second direction opposite to the first direction upon completion of the winding operation. A film pressure plate is associated with the counter driving means to free the film from pressure simultaneously with the initiation of the film winding operation and press the film upon completion of the winding operation.

10 Claims, 7 Drawing Figures

Patented Aug. 28, 1973

DEVICE FOR OPERATING FILM PRESSURE PLATE IN PHOTOGRAPHIC CAMERA

BACKGROUND OF THE INVENTION

The present invention relates to a device for operating a film pressure plate in a photographic camera, more particularly to a device for operating a film pressure plate to be incorporated in a very small camera such as a still camera which uses 9.5 mm (three-eigths in) or 16 mm (five-eigths in) wide film and in which shutter cocking operation is effected in operative relation to film transport movement, the device being adapted to free the film from pressure automatically when the film is wound up.

In the case of ultra-miniature cameras, the film is placed in a double magazine or the like which does not require rewinding of film and which includes a film supply chamber and a take-up chamber and the double magazine is then loaded on the camera. Film transport is effected by rotating a winding knob on a take-up shaft, and upon a predetermined amount of rotation of the knob, suitable transport lock means associated with the transport mechanism acts to stop the rotation and lock the film.

The rotational angle of the take-up shaft for film transport is usually set for example at 120°, namely at such angle as to correspond to the angular displacement of one turn of rotation (i.e. 360°) as divided by an integer. In order to obtain a greater size of photograph, however, there arises a need to set the rotational angle for example at 135°, namely at an angle which does not correspond to a quotient of 360° as it is divided by an integer. In such case, it is difficult to take out directly from the take-up shaft a power source for releasing the pressure plate from the film, so that it is necessary to employ an auxiliary member such as a gear for converting the rotational angle of the take-up shaft to a quotient of 360° as it is divided by an integer and to operate the pressure plate by a member which is given the converted rotational angle.

With ultra-miniature cameras of the type described, only a very limited space is available even for the film transport mechanism and shutter cocking mechanism which are essential to the camera. Accordingly, the necessity of a space for providing independent operating means for the film pressure plate inevitably results in a camera of a greater size and increased difficulty in design.

Further because the magazine containing 9.5 mm or 16 mm wide film has a small volume in itself, the film has a strong tendency to curl up. The pressure plate must accordingly be capable of exerting a greater pressure than is the case with a miniature camera of 35 mm (1⅜ in) format. It is therefore essentially required that during film transport the pressure plate be retracted to free the film from the pressure and to thereby avoid scratches on the film.

Scratches on the film also occur in loading the film in the camera when the film is inserted and slid between the picture frame and the film pressure plate. Moreover, the pressure of the film pressure plate on the picture frame not only impedes the above-mentioned insertion and sliding of the film but also prevents film transport by causing the film leader to be caught on the picute frame when it is advanced.

When the film is taken out of the camera after making the last exposure, some length of the film end is usually left outside the magazine in order to prevent possible exposure of the film wound up in the magazine and to assure convenience of handling during developing procedure. In this state, the end of the film is still held in pressing engagement with the pressure plate, this making it very troublesome to unload the magazine from the camera. If the film is held by the pressure plate with a particularly high pressure, there arises the trouble that a portion of the film wound up in the magazine will be pulled out and exposed when the magazine is taken out.

SUMMARY OF THE INVENTION

An object of this invention is to provide a device for operating the film pressure plate of a simplified construction which is capable of causing the film pressure plate to press the film and free the same from the pressure automatically in operative relation to a film winding operation and which does not require a particular space for the provision thereof.

Another object of this invention is to provide a simplified and compact device of the type described whereby when the film is loaded in or unloaded from the camera the film can be freed from the pressure in operative relation to opening of the camera back and can be pressed in position in operative relation to closing of the camera back.

In accordance with this invention, the film pressure plate is associated with counter driving means for driving the film counter one division by a film winding operation, the pressure plate being coupled with the counter driving means for example by a pin provided on a support for the plate without employing special means.

The counter driving means is controlled by a shutter cocking mechanism and a drive cam to be driven in one direction by a film winding operation and adapted to be stopped when driven a definite angle upon completion of transport of one frame of film. Thus, the counter driving means is quickly moved in a first direction upon initiation of the winding operation to retract the pressure plate from the film and thereby free the film from the pressure. At the same time, the counter driving means advances the counter by one division. Upon completion of the winding operation, the driving means returns in a second direction which is opposite to the first direction to cause the pressure plate to press the film against the predetermined position.

The drive cam may serve also as a transport lock cam for locking the winding means during the film winding operation.

The counter drive means is so arranged as to be controlled, during opening and closing of the camera back, by a member which is shifted upon detecting opening and closing of the camera back. Thus, opening of the camera back causes the control member to drive the counter driving means in the first direction, while the closing of the camera back causes the same to drive the counter driving means in the second direction.

In accordance with this invention, the film counter is driven in operative relation to the film winding operation, and the film pressure plate is driven in operative relation to this movement so as to free the film from the pressure during film winding operation, whereby the film face is protected from possible defacement to be caused during transport. Upon completion of film transport, the film is pressed against the picture frame under a strong pressure, with the result that the film can be retained in correct planar state.

The mechanism for coupling the counter driving means with the film pressure plate has a simple construction comprising a pin on a support for the film pressure plate which pin is engaged in a slot in a lever of the driving means. Thus the coupling means requires only a very small space. The driving force acting on the driving means gives the pressure to be exerted by the pressure plate.

Further in accordance with this invention, the film is released by the pressure plate in operative relation to the opening and closing of the camera back to facilitate film loading in and unloading from the camera.

Other objects and features of this invention will become more apparent from the description of embodiments given below.

DESCRIPTION OF THE PREFERRED EMBODIMENTS

Figure 1:
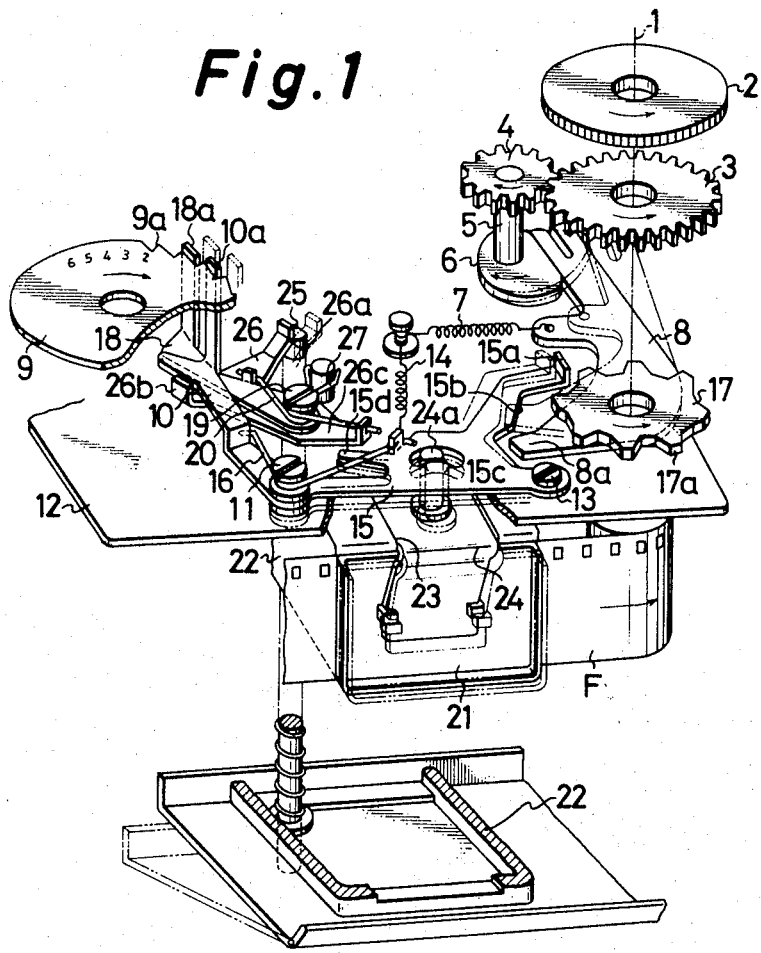
FIG. 1 is a perspective view showing principal parts of an embodiment of this invention.
Figure 2:
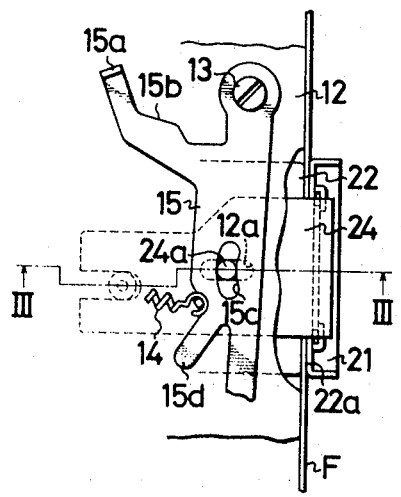
FIG. 2 is a plan view of part of the embodiment.
Figure 3:
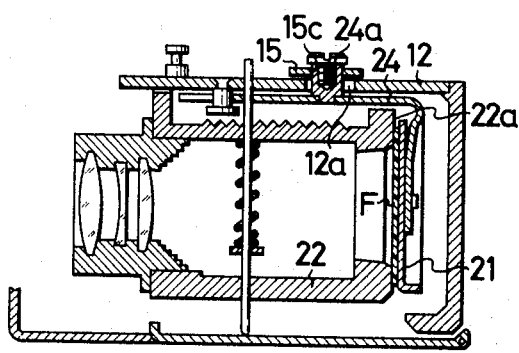
FIG. 3 is a view in vertical section taken along the line III—III in FIG. 2.

Referring to FIGS. 1 to 3, film winding mechanism includes a take-up shaft 1 indicated only in an axial line in the drawing and a winding knob 2 integrally mounted on the shaft 1.

A gear 3 coaxial with the shaft 1 is driven in a counterclockwise direction by the shaft 1 through one-way rotational clutch means. The gear 3 meshes with a gear 4 and rotates the same in a clockwise direction. The gear 3 is held stationary by unillustrated reverse rotation preventing means against clockwise rotation of the shaft 1.

A shutter cocking mechanism includes a cocking cam 6 to be driven integrally with the gear 4 through a shaft 5 and a cocking lever 8 mounted on the shaft 1 and urged by a spring 7 in a counterclockwise direction with its driven portion in contact with the peripheral cam face of the cam 6, the cocking lever 8 thus being adapted for reciprocal pivotal movement by the rotation of the cam 6. The forward or clockwise rotation of the lever 8 tensions a shutter actuating mechanism (not shown).

A counter driving mechanism includes a counter forwarding member 10 having a pawl 10a for engagement with latchet teeth 9a along the outer periphery of a counter plate 9 and a counter driving member 15 having a base portion pivoted to a base plate 12 as at 13 and urged in a clockwise direction by a spring 14. The counter plate 9 is urged in a counterclockwise direction by unillustrated zero-setting means. The base portion of the counter forwarding member 10 is pivoted as at 11 to the distal end of the counter driving member 15.

A spring 16 acts on the members 10 and 15 to urge the counter forwarding member 10 in a counterclockwise direction, so as to assure engagement of the pawl 10a with the latchet tooth 9a of the counter plate 9.

The counter driving member 15 has an arm with a lug 15a which is positioned close to the peripheral cam face of a drive cam 17 mounted on the take-up shaft 1 concentrically therewith and adapted to be driven integrally with the gear 3.

The drive cam 17 has cam projections 17a equidistantly spaced apart along its periphery. During counterclockwise rotation of the drive cam 17, the cam projection 17a pushes the lug 15a of the counter driving member 15 against a spring 14 and thereby drives the driving member 15 in a counterclockwise direction. Upon completion of transport of a predetermined amount of film, the driving member 15 is returned in a clockwise direction by means to be described later.

If, for example, the rotational angle of the take-up shaft for transporting one frame of film F is determined at 135°, the cam projections 17a along the periphery of the drive cam 17 are arranged every 45° about the axis of the shaft. This angle is the greatest common divisor of 135°, the required rotational angle, and 360°, the rotational angle of one turn of rotation of the cam. A lock mechanism (not shown) provided for the drive cam 17 associates with the cam projection 17a every time the cam 17 rotates 135° so as to stop the counterclockwise rotation of the take-up shaft 1. Since one of the projections 17a actuates the lock mechanism every time the cam 17 rotates 135°, it becomes possible to accurately control an angle of winding rotation which does not correspond to a quotient of 360° as it is divided by an integer.

Because the lug 15a of the counter driving member 15 engages in the recess between the cam projections 17a every time the cam 17 rotates 135°, it is also possible for the cam 17 to serve as a locking cam for film transport. Alternatively, the lug 15a can be associated with the peripheral cam face of the locking cam.

The counter driving member 15, which is urged by the spring 14 in a clockwise direction all the time, tends to return upon the cam projection 17a moving past the lug 15a. This gives rise to an objection in that if the cam projections 17a are arranged every 45°, the rotational angle of the drive cam, the counter driving member 15 makes a reciprocal pivotal movement every time the take-up shaft rotates 45°.

On the other hand, the cocking lever 8 is controlled by the cocking cam 6 which is rotated a turn through the gears 3 and 4 when the take-up shaft 1 rotates, for instance, through 135° and performs a stroke of pivotal movement during one turn of rotation of the cocking cam 6. Accordingly, the cocking lever 8 is formed with a projection 8a which is brought into engagement with an engaging portion 15b of the counter driving member 15, as shown in the phantom line in FIG. 1, by the forward movement of the cocking lever, after the counter driving member 15 has been driven by the drive cam 17 in a counterclockwise direction, whereby the returning movement of the driving member 15 is temporarily prevented. The arrangement is further such that upon the cocking cam 6 completing one turn of rotation causing the cocking lever 8 to return from the position of phantom line to the position of solid line in FIG. 1, the counter driving member 15 moves back clockwise under the action of the spring 14. Thus, the counter driving member 15 performs a stroke of reciprocal pivotal movement in corresponding relation to the angular displacement of the drive cam 17 (for instance through 135°) which corresponds to one turn of rotation of the cocking cam 6.

A lever 18 for preventing reverse rotation of the counter is pivotally mounted on the base plate 12 as at 19 and urged counterclockwise by a spring 20. A pawl 18a of the lever 18 is in engagement with the latchet tooth 9a of the counter plate 9 to prevent the counterclockwise rotation of the counter plate 9 when the pawl 10a of the member 10 is in preparation for forwarding the plate by one tooth during the return of the counter driving member 15.

A film pressure plate 21 is attached to the bent lower edge of a support plate 24 disposed between the top face of a dark box 22 and the base plate 12 and adapted to be guided for backward and forward movement by guide grooves 23 formed in the top face. A pin 24a extending from the top face of the support plate 24 projects from the base plate 12 through a slot 12a formed in the base plate 12 and engages in a slot 15c in the counter driving member 15. In this way, the film pressure plate 21 is associated with the driving member 15. Thus during a photographing operation, the film F is pressed under the action of the spring 14 against a picture frame 22a of the dark box 22 in accurately planar state, while the film is freed from the pressure by the forward movement of the driving member 15 (i.e. movement in the first direction toward the phantom line position of FIG. 1) upon initiation of winding operation.

Accordingly, simultaneously with initiation of winding action, the drive cam 17 drives the counter driving member 15 in the forward direction (i.e. in the first direction), permitting the counter plate 9 to rotate by one latchet tooth 9a to thereby forward the counter for one frame of film. At the same time, the pressure plate 21 is retracted to free the film from the pressing engagement. After temporarily preventing the return of the counter driving member 15, the cocking lever 8 releases the driving member 15 upon completion of a winding operation, permitting the member 15 to return in the second direction under the action of the spring 14, with the result that the pressure plate 21 holds the film F in the predetermined position in pressing engagement therewith. At the same time, the pawl 10a of the counter forwarding member 10 slides on the latchet tooth 9a in the direction oppsite to that of the one frame forwarding movement and engages in the next latchet tooth as shown in the solid line in FIG. 1.

In order to operate the pressure plate 21 in operative relation to the opening and closing of the camera back to free the film from the pressing engagement, with the camera back in open position, there is provided an interlocking member 25 which projects upward from the base plate 12 when the camera back is closed and which retracts from the base plate 12 when it is opened. Various mechanisms for interlocking the camera back with the interlocking member 25 have heretofore been employed and proposed as part of the means for returning the counter to zero position and in the illustrated mechanism which is shown merely by way of example, the interlocking member 25 is spring biased toward the hinged camera back so as to be raised and lowered respectively with the closing and opening of the camera back. Since the present invention employs an interlocking mechanism of the conventional structure, description and illustration of this mechanism will not be given.

In addition to the reverse rotation preventing member 18, the pivot 19 on the base plate 12 further supports another lever 26 for resetting the counter to the zero position. The lever 26 is urged in a clockwise direction by a spring 27.

The zero-setting lever 26 includes a driven slanting face 26a, a lug 26b and a drive portion 26c at its tail end. The driven slanting face 26a enables the resetting lever 26 to be rotated counterclockwise by the projection of the interlocking member 25 and to be rotated by a spring 27 in a clockwise direction by the retraction of the lever 26. The clockwise rotation of the resetting lever 26 causes the lug 26b to drive the counter forwarding member 10 and reverse rotation preventing lever 18 in a clockwise direction and thereby disengage the pawls 10a and 18a from the latchet teeth 9a of the counter plate 9, permitting the counter plate 9 to return to the zero position, the lug 26b further being such that the counterclockwise rotation of the lever 26 permits the members 10 and 18 to rotate in a counterclockwise direction under the action of springs 16 and 20, with the pawls 10a and 18a brought into engagement with the latchet teeth 9a. The clockwise rotation of the zero-resetting lever 26 causes the drive portion 26c to push the driven portion 15d of the counter driving member 15 and thereby move the member 15 in the first direction. When the lever 26 rotates in a clockwise direction, the drive portion 26c permits the member 15 to return in the second direction.

When the camera back is opened, the interlocking member 25 retracts from above the base plate 12, driving the resetting lever 26 in a clockwise direction to return the counter to the zero position and, at the same time, retracting the pressure plate 21 through the counter driving member 15 to free the film F from pressure. When the camera back is closed, the interlocking member 25 projects upward from the base plate 12 to rotate the resetting lever 6 in a counterclockwise direction, making the counter ready for forwarding movement and advancing the pressure plate 21 through the counter driving member 15 so as to press the film F to the predetermined position.

In accordance with the embodiment described, the film pressure plate is adapted for contact with the film F over its entire surface and is merely attached to the lower portion of bent edge of the support plate 24. While it is necessary for the entire face of the pressure plate to apply a uniform pressure on the film, there may be a need to provide an inspection window in the pressure plate for the adjustment of optical system of the camera.

However, the provision of a window makes it impossible to apply uniform pressure on the center of the pressure plate, hence the provision of such window requires some improvement in the support means for the film pressure plate. FIGS. 4 to 7 show support means for the pressure plate which fulfil the above requirements.

Figure 4:
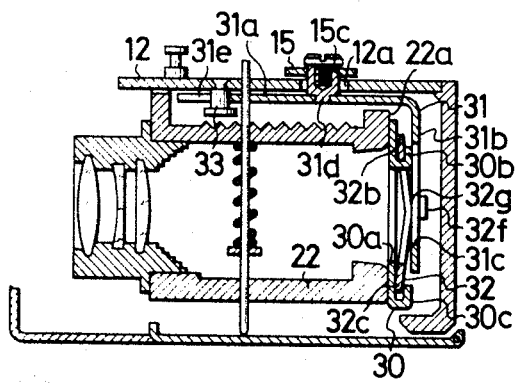
FIG. 4 is a view in vertical section showing another embodiment of support means for a film pressure plate.
Figure 5:
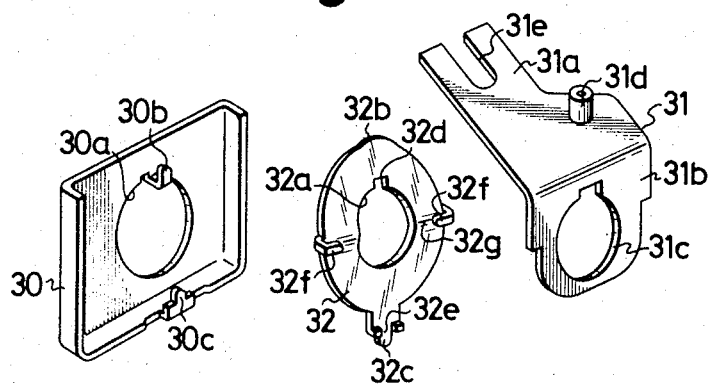
FIG. 5 is an exploded perspective view of the respective parts of the same.

With reference to FIGS. 4 and 5, a film pressure plate 30 is formed at its center with a window 30a which is provided with holding pieces 30b and 30c at its upper and lower portions.

A support plate 31 has a portion 31a positioned between the top face of a dark box 22 and the under face of a support plate 12 and a portion 31b extending downward from one end of the portion 31a. The portion 31b is formed with a window 31c in corresponding relation to the window 30a. A pin 31d provided on the portion 31a projects upward from the base plate 12 through a slot formed therein and engages in a slot 15c formed in a counter driving member 15 on the base plate 12 as in the embodiment of FIGS. 1 to 3. Thus, the support plate 31 is slidable back and forth, following the movement of the counter driving member 15.

Disposed between the pressure plate 30 and the support plate 31 is a washerlike intermediate member 32 made of a resilient plate such as spring plate and formed with a similar window 32a. The intermediate member 32 is bent along a horizontal diametrical line and has its upper and lower portions contact portions 32b and 32c for the pressure plate 30 and engaging portions 32d and 32e for engagement with the holding pieces 32b and 32c. At the left and right of the intermediate member 32, holding pieces 32f for the support plate 31 are formed. The respective parts are assembled by the holding pieces. The angled portion 32g bears against the portion 31b of the support plate 31.

Instead of forming guide grooves 23 in the top face of the dark box 22 for guiding the support plate 31 in sliding movement back and forth, the portion 31a may be formed at its one end a bifurcated part 31e in which a pin 33 on the under face of the base plate 12 engages. The pin 33 cooperates with the pin 31d engaged in the slot 12a to guide the support plate 31.

The pressure to be exerted on the pressure plate 30 for pressing the film when the counter driving member 15 is returned in the second direction is delivered to the pressure plate 30 through the intermediate member 32 which is in line contact with the portion 31b of the support plate 31 and which contacts the pressure plate 30 at two points above and below the position of the line contact, with the result that uniform pressure is exerted on the entire pressing face of the pressure plate 30. Since the pressure is urged at the above-mentioned two points, projection or deformation of the central portion of the pressure plate due to the pressure can be eliminated, which will occur when the pressure acts on the pressure plate 30 at a central one point. Thus, it is possible to use a thinner pressure plate.

Figure 6:
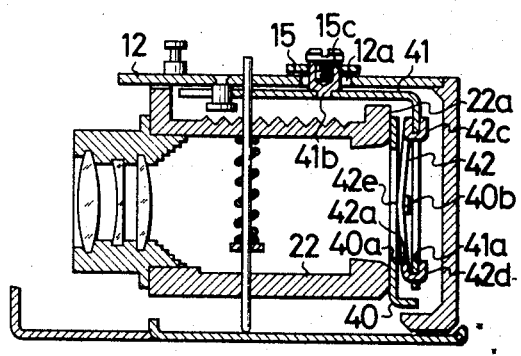
FIG. 6 is a view in vertical section showing another embodiment of support means for the film pressure plate.
Figure 7:
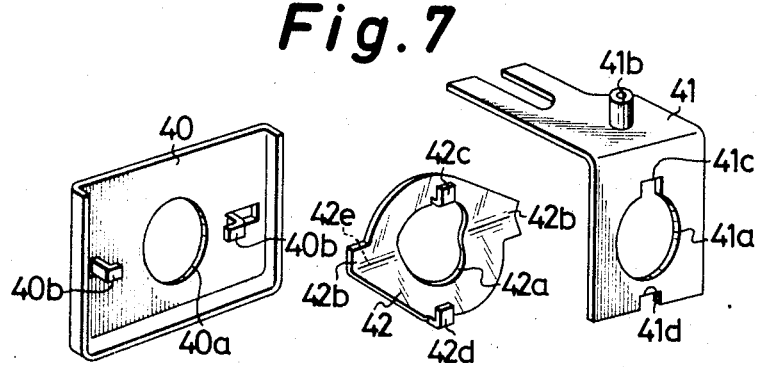
FIG. 7 is an exploded perspective view of the respective parts of the same.

FIGS. 6 and 7 show an embodiment wherein the intermediate member is bent in a direction opposite to that in FIGS. 4 and 5.

A pressure plate 40 formed with a window 40a has holding pieces 40b on the left and right of the window 40a. A support plate 41 has a window 41a, a pin 41b for associating the plate with a counter driving member 15 and engaging portions 41c and 41d at upper and lower portions of the window 41a for engagement with an intermediate member 42.

The intermediate member 42 provided with a window 42a is bent along a horizontal diametrical line and has at its left and right ends engaging portions 42b for the holding pieces 40b on the pressure plate 40. At upper and lower portions of the window 42a, the intermediate member 42 has holding pieces 42c and 42d for the engaging portions 41c and 41d of the support plate 41. The parts are assembled in such manner that the angled portion 42e of the intermediate member 42 is in line contact with the portions of the pressure plate 40 on the opposite sides of the window 40a and the upper and lower ends of the intermediate member 42 bear against the support plate 41 for two-oint contact.

With this construction, pressure for pressing the film can be distributed uniformly on the entire face of the pressure plate.

I claim:

1. A device for operating a film pressure plate in a photographic camera comprising:
   winding means having a drive cam rotatable in one direction in operative relation to a film winding operation and to be stopped upon completion of one frame of film transport,
   counter driving means for driving a film counter by one division at a time, said driving means being initiated by said drive cam into a quick movement in a first direction upon initiation of the film winding operation and movable backward in a second direction opposite to the first direction upon completion of the winding operation, and
   means for coupling said counter driving means with a film pressure plate so as to move said film pressure plate in a direction to free the film from the pressure by the movement of said counter driving means in the first direction and to cause said film pressure plate to press the film by the return of said driving means in the second direction.

2. The device as set forth in claim 1 which includes a shutter cocking member operable in operative relation to said winding means, said shutter cocking member preventing said counter driving means from returning in the second direction until the film winding operation is completed.

3. The device of claim 1 including control means responsive to the opening and closing of the camera back for respectively effecting the operational disengagement and engagement between said film counter and said driving means.

4. The device as set forth in claim 3 wherein said counter driving means includes a counter forwarding member for moving a counter plate by one division by the movement of said driving means in the first direction and a lever for preventing reverse rotation of the counter for impeding return of the counter to zero position, and said control means is in operative relation to said counter forwarding member and said reverse rotation preventing lever so as to cause the pressure plate to release the film and initiate zero-returning action of the counter upon opening of the camera back.

5. The device as set forth in claim 1 wherein said coupling means comprises a support plate for supporting said film pressure plate and a pin for operatively associating said support plate with said counter driving means.

6. The device as set forth in claim 5 wherein means for supporting said film pressure plate is provided with a washerlike intermediate member disposed between said pressure plate and said support plate, and said intermediate member is bent along its diametrical line with its bent top portion in contact with one of said pressure plate and said support plate, said intermediate member being in contact with the other plate at two points above and below the bent top portion.

7. The device of claim 1 wherein said winding means comprises a take-up shaft rotatable a predetermined first angle with the advance of a unit film frame and said drive cam includes a plurality of peripherally equally spaced cam projections, successive cam projections being spaced a predetermined second angle, the quotient of 360° divided by the value of said first angle not being an integer, and the value of said second angle being equal to the greatest common divisor of 360° and of the value of said first angle.

8. The device as set forth in claim 1 wherein said drive cam serves also as a transport lock cam.

9. A device for operating a film pressure plate in a photographic camera comprising:
    winding means having a transport lock cam rotatable in one direction in operative relation to a film winding operation and to be stopped upon completion of one frame of film transport,
    a shutter cocking member operable in operative relation to said winding means,
    a driving member in contact with said transport lock cam and quickly movable in a first direction under the action of said transport lock cam upon initiation of the film winding operation to be retained by said shutter cocking member in engagement therewith, said driving member being returnable in a second direction opposite to the first direction when freed from the retention upon completion of the winding operation, and
    coupling means for releasing said film pressure plate from the film and causing the same to press the film by the movements of said driving member in the first and second directions respectively.

10. The device as set forth in claim 9 wherein said winding means further includes a winding gear rotatable in one direction and a shutter cocking cam to be driven one turn by one frame of film transport in operative relation to said gear, and said shutter cocking member is a cocking lever to be reciprocally movable by one turn of rotation of said cocking cam, said cocking lever being movable in a forward direction to retain said driving member and thereby prevent the same from returning in the second direction when said transport lock cam moves said driving member in the first direction upon initiation of the winding operation, said cocking lever being movable in a backward direction to free said driving member from retention and permit the same to be urged backward in the second direction.

* * * * *